H. CRESCA.
SPRING MOTOR REWINDING MECHANISM.
APPLICATION FILED DEC. 3, 1915.

1,182,252.

Patented May 9, 1916.
2 SHEETS—SHEET 1.

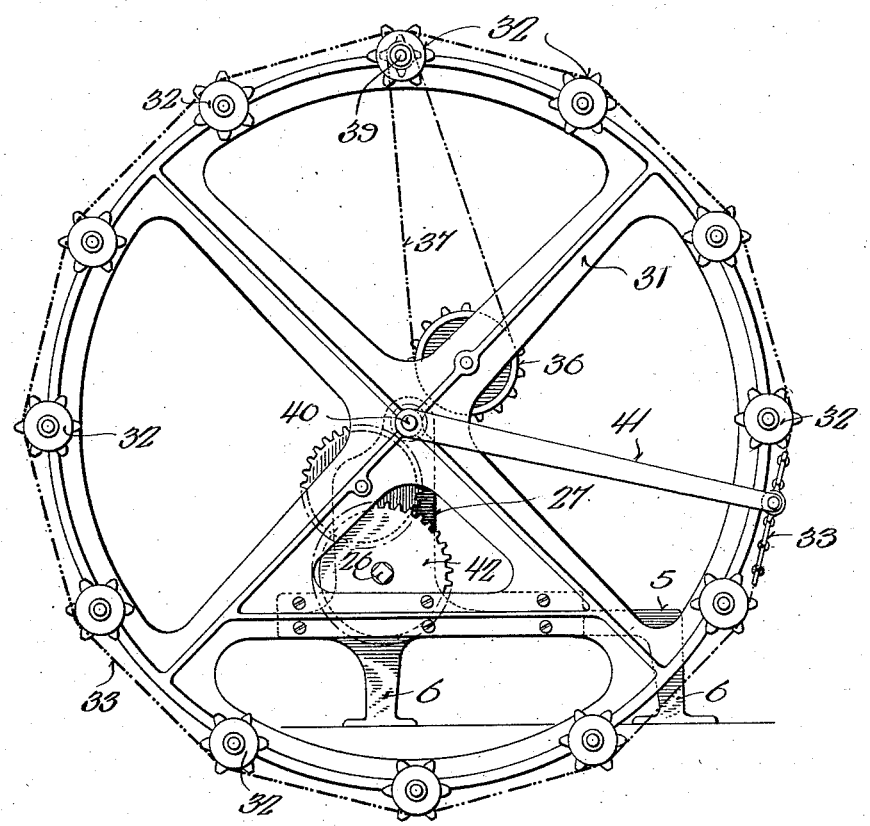

UNITED STATES PATENT OFFICE.

HENRY CRESCA, OF MILWAUKEE, WISCONSIN.

SPRING-MOTOR-REWINDING MECHANISM.

1,182,252. Specification of Letters Patent. Patented May 9, 1916.

Application filed December 3, 1915. Serial No. 64,806.

*To all whom it may concern:*

Be it known that I, HENRY CRESCA, a citizen of the United States, and resident of Milwaukee, in the county of Milwaukee and State of Wisconsin, have invented certain new and useful Improvements in Spring-Motor-Rewinding Mechanism; and I do hereby declare that the following is a full, clear, and exact description thereof.

The present invention is directed to new and useful improvements in spring motor structures and has for its primary object the provision of means whereby a partial rewinding of a motor may be procured as part of the work initially done by the motor whereby the length of time which elapses in the expenditure of the entire energy of the motor may be materially lengthened.

It is more specifically an object to provide such a rewinding means in connection with a motor which is comparatively simple in nature, and whereby the rewinding operation is continuous and constant during the operation of the motor.

With the above and other objects and advantages in view, the invention resides more particularly in the novel combination, arrangement and formation of parts more particularly hereinafter described and particularly pointed out in the appended claims.

Figure 1:
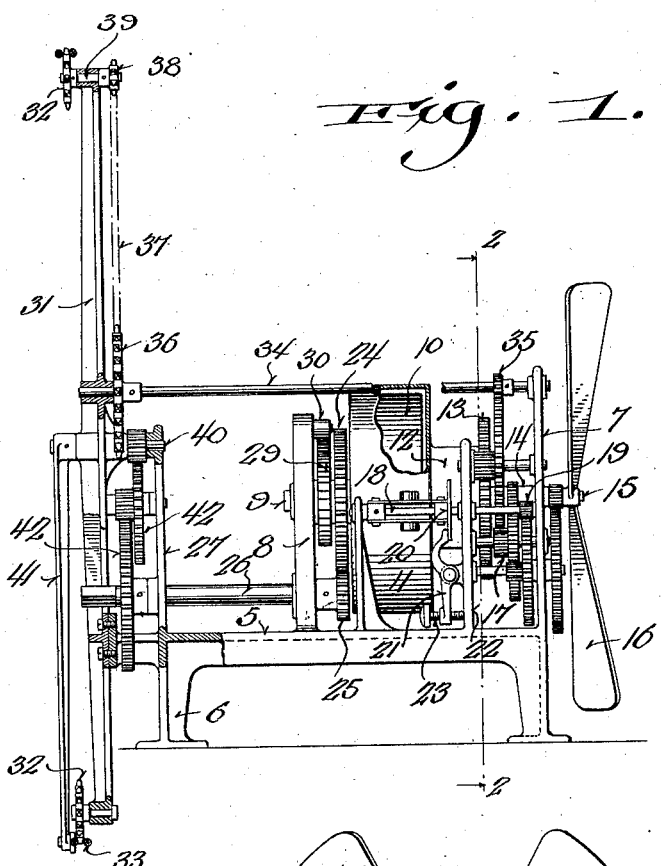
Figure 2:
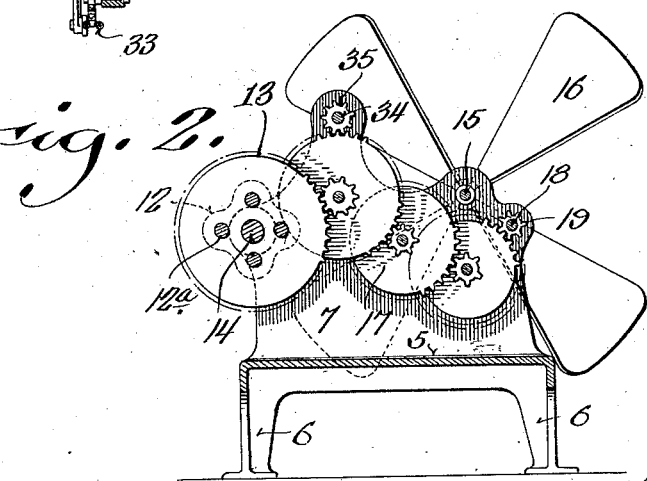

In the drawings Figure 1 is a side elevational view of a spring motor structure having the improved rewinding mechanism associated therewith, with parts thereof broken away; Fig. 2 is a sectional view taken vertically on the line 2—2 of Fig. 1 and showing the gear transmission from the motor to the work shaft, the governor and the rewinding mechanism, and Fig. 3 is an end view of the structure shown in Fig. 1, showing more particularly the rewinding mechanism.

Referring now more particularly to the accompanying drawings, there is provided a base or bed plate 5 supported by the legs 6 and having a vertical bearing wall 7 at one end. Upstanding from the intermediate portion of the bed-plate is a standard 8 in which is journaled the hub shaft 9 of a spring motor which includes the spring 10 connected with the hub and with a rotatable housing 11 closed at one end and carrying on said end a central boss 12 to which is secured as by the bolts 12ª a gear wheel 13, this gear wheel having a shaft section 14 projecting axially therefrom and journaled in the wall 7 whereby a bearing is had for the motor structure. Journaled also in the wall 7 is the work shaft 15 which in the present instance carries a fan 16 and which is connected with the gear-wheel 13 by an increasing train of gears 17.

Although a specific form of motor structure has been described, it will be understood that any suitable motor structure may be employed in connection with the present invention, and that the shaft 15 may be used in other connections and perform other work than driving the fan 16.

For regulating the speed of operation of the motor a governor shaft 18 is provided which has a pinion 19 meshing with one of the gears of the train 17 and this shaft carries a governor mechanism including a weight controlled disk member 20 which is engageable by a brake lever 21 which is intermediately pivoted to a standard 22 on the bed and has one end formed as a shoe to engage the disk and its other end threaded to receive an adjusting screw 23 adapted to bear against the standard, this standard serving also as a bearing for the governor shaft and as a bearing for certain of the train of gears 17.

For initially winding the motor the hub-shaft has fixed thereon a gear wheel 24 which meshes with a pinion 25 carried by a shaft 26 journaled in the standard 8 and extended therefrom and journaled in a second standard 27 carried by the end of the bed opposite the wall 7, the free end of this shaft being squared for engagement of a key member. Retrograde movement of the hub shaft 9 is prevented by a ratchet wheel 29 carried thereon and engageable by a pawl 30 on the standard 8.

Taking up now the rewinding mechanism, there is provided at the end of the bed opposite the wall 7 a frame 31 in the form of a wheel and disposed around the periphery of this frame are a series of sprocket pinions 32 which carry a sprocket chain 33. A shaft 34 is journaled in the wall 7 and in the frame 31 and this shaft carries on one end a pinion 35 meshing with one of the train of gears 17 and carries on its other end a sprocket wheel 36 around which is trained a chain 37 also associated with a sprocket pinion 38 carried by a shaft 39 journaled in the peripheral portion of the frame, this shaft having fixed thereon one of the sprocket pinions 32 whereby the chain 33 is rotated upon rotation of the motor. Journaled in the hub portion of the frame is a shaft 40 and this shaft projects outwardly of the frame and carries an arm 41 which extends radially with respect to the frame and is secured at its outer end to a portion of the chain 33. A series of increasing gears 42 connect the shaft 40 and the rewind shaft 26 of the motor. Thus, as the motor is operated part of its energy is expended in rotating the shaft 34, which through the sprocket chain 33 and radial arm 41 rotates the shaft 40 and consequently the rewind shaft 26 so that a portion of the energy expended is utilized to procure a partial rewinding of the motor, whereby the length of time necessary for a complete dissipation of the power of the motor is considerably lengthened. As the size of the frame 31 is considerable, it is seen that a relatively great leverage is provided through the medium of the radial arm 41 whereby a considerably slight force may operate to procure a rewinding action of the motor without the use of an excessively large train of increasing gears between the rewind shaft and the shaft which initially imparts the power for rewinding.

What is claimed is:

1. The combination with a spring motor including a work member and a rewinding shaft of means operable by the work member for operating the rewinding shaft including a third shaft, a radial arm carried by the third shaft, means operable by the work member for rotating said arm, and an operative connection between the third shaft and the rewind shaft.

2. The combination with a spring motor including a work member and a rewind shaft of a circular series of sprocket wheels, a shaft concentric with said series, a chain on said wheels, a radical arm on the shaft connected with the chain, an operative connection between the work member of the motor and the chain, and an operative connection between the shaft and the rewind portion of the motor.

3. A spring motor structure of the class described comprising a base, a motor on the base and including a work portion and a rewind shaft, a circular frame on the base, a series of sprockets disposed about the periphery of the frame, a chain on said sprockets, a second shaft journaled centrally of the frame, a radial arm on the shaft connected with the chain, a third shaft, an operative connection between said third shaft and the work portion of the motor, an operative connection between said third shaft and the chain, and an operative connection between the first shaft and the rewind portion of the motor.

4. A structure of the class described comprising a motor including a work portion and a rewind shaft, a work shaft, a train of gears operatively connecting said work portion and the work shaft, a governor shaft, a governor on said shaft, a gear on the governor shaft meshing with one of said train of gears, a second shaft, a radial arm projecting laterally from the shaft, means engaging the outer portion of the arm to rotate said arm shaft, said means being actuated by one of said train of gears, and an operative connection between the second shaft and the rewind shaft.

In testimony that I claim the foregoing I have hereunto set my hand, at Milwaukee, in the county of Milwaukee and State of Wisconsin, in the presence of witness.

HENRY CRESCA.

Witness:
M. E. DOWNEY.

Copies of this patent may be obtained for five cents each, by addressing the "Commissioner of Patents, Washington, D. C."